United States Patent
Oberli et al.

(10) Patent No.: US 10,786,775 B2
(45) Date of Patent: Sep. 29, 2020

(54) SEPARATING DEVICE

(71) Applicant: RT-FILTERTECHNIK GMBH, Friedrichshafen (DE)

(72) Inventors: Frank Oberli, Eglisau (CH); Andreas Steiche, Hermsdorf (DE); Robert Kessel, Schoengleina (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 241 days.

(21) Appl. No.: 15/750,564

(22) PCT Filed: Aug. 10, 2016

(86) PCT No.: PCT/EP2016/001377
§ 371 (c)(1),
(2) Date: Feb. 6, 2018

(87) PCT Pub. No.: WO2017/032447
PCT Pub. Date: Mar. 2, 2017

(65) Prior Publication Data
US 2019/0009205 A1    Jan. 10, 2019

(30) Foreign Application Priority Data
Aug. 27, 2015   (DE) .................. 10 2015 011 225

(51) Int. Cl.
*B01D 50/00* (2006.01)
*B01D 46/24* (2006.01)
(Continued)

(52) U.S. Cl.
CPC ........... *B01D 50/002* (2013.01); *B01D 45/08* (2013.01); *B01D 45/16* (2013.01);
(Continued)

(58) Field of Classification Search
CPC ............. B01D 50/002; B01D 46/0045; B01D 46/0024; B01D 45/16; B01D 45/08; B01D 46/2403; B01D 2267/40
See application file for complete search history.

(56) References Cited

U.S. PATENT DOCUMENTS

| 970,477 A | 9/1910 | Dunn |
| 2,068,048 A * | 1/1937 | Adams ................. B01D 50/002 55/318 |

(Continued)

FOREIGN PATENT DOCUMENTS

| AT | 335 985 | 4/1977 |
| CA | 891035 | 1/1972 |

(Continued)

OTHER PUBLICATIONS

International Search Report (ISR) dated Oct. 24, 2016 in International (PCT) Application No. PCT/EP2016/001377.

*Primary Examiner* — Dung H Bui
(74) *Attorney, Agent, or Firm* — Wenderoth, Lind & Ponack, L.L.P.

(57) ABSTRACT

A separating device, particularly a spiral separator (10), separates impurities, particularly in the form of solids, from a gaseous medium flow, such as air. The medium can be fed to a spiral-shaped guiding device (42) that brings about an at least partial separation of the respective impurities from the medium flow. The guiding device (42) has a plurality of spiral arms (44) that delimit radially extending flow spaces (46) and that are arranged in an adjacent manner opposite to one another such that the medium flow is guided radially outwards.

16 Claims, 5 Drawing Sheets

(51) Int. Cl.
  *B01D 45/08* (2006.01)
  *B01D 45/16* (2006.01)
  *B01D 46/00* (2006.01)

(52) U.S. Cl.
  CPC ..... *B01D 46/0024* (2013.01); *B01D 46/0045* (2013.01); *B01D 46/2403* (2013.01); *B01D 2267/40* (2013.01)

(56) References Cited

U.S. PATENT DOCUMENTS

| | | | |
|---|---|---|---|
| 2,282,831 A | 4/1958 | Boretti et al. | |
| 2,998,100 A | 8/1961 | Pike | |
| 3,845,840 A * | 11/1974 | Thrasher | F01N 1/10 181/230 |
| 4,158,449 A * | 6/1979 | Sun | B01D 46/10 244/136 |
| 4,162,905 A * | 7/1979 | Schuler | B01D 45/16 55/337 |
| 4,311,494 A * | 1/1982 | Conner | B01D 45/16 55/394 |
| 4,420,314 A * | 12/1983 | Barron, Jr. | B04C 5/06 55/436 |
| 4,976,748 A * | 12/1990 | Prinsloo | B04C 3/06 95/269 |
| 5,403,367 A * | 4/1995 | De Villiers | B01D 39/1615 55/320 |
| 5,494,501 A * | 2/1996 | Anspach | B01D 45/14 55/330 |
| 9,463,409 B2 * | 10/2016 | Lee | B01D 50/002 |
| 10,130,957 B2 * | 11/2018 | Buck | B04B 5/12 |
| 2002/0139097 A1 * | 10/2002 | Brilmaker | B01D 45/14 55/456 |
| 2008/0110140 A1 * | 5/2008 | Egger | B01D 50/002 55/337 |
| 2010/0154367 A1 * | 6/2010 | Luo | A47L 9/1608 55/337 |
| 2012/0067788 A1 * | 3/2012 | Boele | B01D 45/14 209/132 |
| 2015/0075377 A1 * | 3/2015 | Gorbach | B04B 5/12 95/270 |
| 2018/0169553 A1 * | 6/2018 | Billiet | B01D 45/16 |

FOREIGN PATENT DOCUMENTS

| | | |
|---|---|---|
| DE | 10 2010 014 278 | 10/2011 |
| EP | 2 471 588 | 7/2012 |
| GB | 517 206 | 1/1940 |

\* cited by examiner

SEPARATING DEVICE

FIELD OF THE INVENTION

The invention concerns a separating device, in particular in the manner of a spiral separator, for the separation of solids from a gaseous medium flow, which may be fed into a spiral-shaped guiding device.

BACKGROUND OF THE INVENTION

DE 10 2010 014 278 A1 discloses a cyclone separator for the separation of liquid and/or solid particles from a gaseous flow, comprising a first cyclone component with at least one, essentially cylindrical, cell pipe that is provided with a guiding device, which may be used to cause the gas flow to go into rotation for the purpose of separating the particles. Moreover, the known solution is provided with a particle outlet to discharge the separated particles from the device, as well as a second cyclone component, disposed subsequently in flow direction of the gas flow, with at least one immersion pipe that is contained inside the cell pipe, and which is at least partially attached to the downstream end of the cell pipe, following the flow direction of the gas stream, as well as a central outlet for discharging the cleaned gas flow.

That known cyclone separator is advantageously made in form of a multicell cyclone in which the first cyclone component is provided with a plurality of cell pipes and the second cyclone component is provided with a plurality of immersion pipes. Due to the multicell cyclone design of the known solution, the respective solids can be separated from the gaseous medium flow with a high degree of efficiency. Nevertheless, this design is complex in implementation, and thus, expensive.

EP 2 471 588 A1 discloses a further device for the separation of liquids from gaseous media, comprising a device container with a gas inlet and a gas outlet as well as a separating element, in particular in form of an air/oil separator. The separator is disposed in the flow path between gas inlet and gas outlet. This known solution uses a spiral separator with only one spiral arm in form of a spiral-shaped flow container that is disposed between the gas inlet and the separating element. The spiral separator subdivides the container into an upper chamber and a lower chamber.

The known device avoids turbulence inside the flowing medium during operation and facilitates a compact design. Nevertheless, the known solution is lacking with respect to its separating performance in removing liquid as contaminants from the flow of gaseous media.

SUMMARY OF THE INVENTION

Based upon this prior art, an object of the invention to further improve the known solutions in such a way that a separating device is provided that saves on installation space, can be implemented cost-effectively and still performs reliably in operation at a high degree of separation.

This object is basically met by a separating device where a spiral-shaped guiding device for the medium flow is provided with a plurality of individual spiral arms. The individual spiral arms are arranged in adjacent pairs and delimit radially extending flow spaces located opposite to each other in such a way that the medium flow is directed outwards. A high degree of separation of contaminants from the gaseous medium flow is then achieved in a functionally reliable manner because of the plurality of fixed, spiral-shaped guide vanes of the spiral separator. Moreover, the spiral separator can be produced in a cost-effective and space-saving manner. This structure has no equivalent in the prior art.

In a preferred embodiment of the separating device according to the invention, the medium flow, which is present particularly in form of a gas stream contaminated with solid particles, such as dust-laden, surrounding air, is supplied via a medium inlet of a housing of the device, axially to a central area of the guiding device, in which the individual spiral arms of the guiding device meet. In particular, where the medium inlet opening gradually reduces in the direction of the guiding device, the medium flow can initially be sped up prior to a uniform distribution into the distribution chambers of the spiral separator delimited by the spiral arms. This structure is favourable for the further acceleration via the spiral-shaped vanes of the guiding device in radial direction when viewed outwards.

In a particularly preferred embodiment of the separating device according to the invention, at least some of the spiral arms used for the guiding device, but preferably all spiral arms, are arranged in adjacent pairs that delimit flow spaces. The progression of the spiral arms from a central section of the guiding device is either diverging towards the outside, converging or is essentially constant where the spiral arms extend parallel to each other. Through the described arrangement of the individual spiral arms, that is, diverging, converging or parallel, the flow velocity may be reduced, accelerated or maintained essentially constant by the guiding device. This structure has no parallel in the prior art.

In a further preferred embodiment of the separating device according to the invention, the spiral separator is surrounded by a housing with a predeterminable, radial gap so that, due to the spiral-shaped flow of the medium caused by the spiral arms of the guiding device, the contaminants separated from the medium flow, such as solids, are able to precipitate on the inside of said housing. Apart from the solids contamination already discussed, it is also possible to precipitate drops of liquid, such as condensate (water) etc. from the gas stream.

In a further particularly preferred embodiment of the separating device according to the invention, the respective spiral arms of the guiding device follow the curve of a Fibonacci spiral at least outside of its common, inner joining section. Thus, a kind of golden section is achieved for the spiral shape of each spiral arm, which section has a most favourable effect on the energetic flow control of the medium flow.

In a further preferred embodiment of the separating device according to the invention, all spiral arms of the guiding device are the same. In particular they all have the same length and the same height, so that the rotationally symmetrical spiral separator can be disposed inside the housing of the separating device in any desired installation direction in longitudinal direction. Moreover, that spiral separator with its fixed spiral arms that form the guide vanes of the guiding device can be produced cost-effectively, for example, as an injection-moulded plastic component. Due to the symmetrical design of the spiral separator, an equally good discharge rate is achieved for the medium flow as well as for the desired separation rate in every direction of the spiral separator.

In a further particularly preferred embodiment of the separating device according to the invention, the spiral-shaped guiding device is made in form of a pre-separator that is followed at least in a downstream direction of the medium flow by an air filtration system. Any solids contamination, especially in form of particulate contamination, that has not yet precipitated from the medium flow, can be reliably removed in this manner by the filter medium used, prior to conveying the air-gas flow from the separating device to the respective combustion chamber of a combustion engine for which the separating device according to the invention undertakes the air filtration process.

The air filtration system may preferably be provided with a main filter element with greater filter fineness and a safety filter element with reduced filter fineness that is disposed concentrically inside the main filter element or which is located downstream. In the instance that this air filter element in form of the main filter element has to be replaced with a new element once it has been subjected to particulate contamination, and the main filter element is accidentally left out during the intended exchange, the safety filter element would perform a sufficiently high level of separation of any remaining particulate contamination in the operation of the separating device without causing any damage to the combustion engine.

The medium flow, which has been cleaned from any solids, exits the device housing after passing through the air filtration system via a medium outlet, which is disposed coaxial to the medium inlet in the same housing. The combustion engine that is connected to the separating device moves the medium or gas flow, seen in axial direction, in an accelerated manner through suction from the air inlet to the air outlet in axial direction through the device housing. The axial flow is superimposed by the radial air stream of the spiral pre-separator so that overall, starting with the spiral pre-separator, idealised an even, spiral-shaped medium flow forms inside the device housing, in particular along its inner wall. In an energetically particularly advantageous manner, a flow through the separating device as a whole is then achieved. The spiral-shaped medium flow is also advantageous because the main filter element, which extends in axial direction inside the device housing, is also evenly surrounded by a spiral-shaped flow. In this manner, the particulate contamination still remaining in the medium flow is uniformly separated through the filter medium of the main filter element. In this way, the main filter element is uniformly loaded with the particulate contamination and is then available for a long service life. In summary, the device is continuously supplied through a medium inlet with a stream of more or less contaminated medium, which is cleaned by the spiral pre-separator and filter system and delivered to a medium outlet, being the suction side of the combustion engine with its combustion chambers is connected.

Since the device housing is provided, besides the medium inlet and outlet, with at least one further opening for the discharge of the precipitated solids, the solid contaminants cab be easily discharged from the separating device into the environment. The respective discharge opening may be provided with a closable discharge valve to be able to discharge the contaminants from the separating device in batches or continually. Within the scope of the described air filtration for the combustion engine, the particulate solids contamination is usually dust from the surrounding air in which the combustion engine is used, for example for driving a machine.

The housing may preferably be made from multiple parts. Preferably, the housing parts can be detached from each other. The spiral-shaped guiding device is preferably disposed in one housing part and the above-described filter system in the other housing part. It is then possible to separate the individual housing parts from each other when required. The one housing part with the filter system may remain on the combustion engine to facilitate the exchange of filter elements, in particular the exchange of the main air filter element for a new element.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are diagrammatic and not to scale.

DETAILED DESCRIPTION OF THE INVENTION

Figure 1:
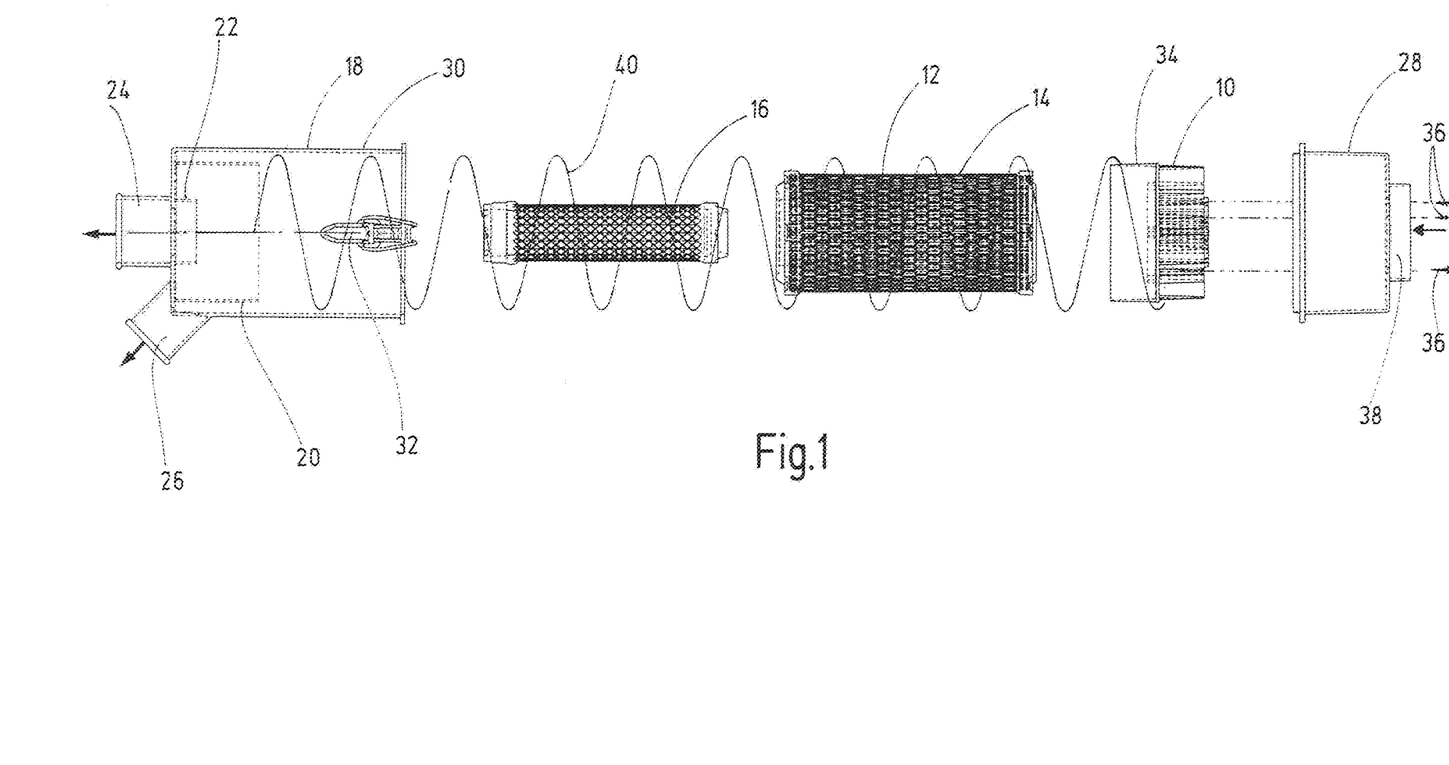
FIG. 1 is an exploded side view of a separating device as a whole according to an exemplary embodiment of the invention.

The separating device shown in FIG. 1 shows, as pre-separator, a spiral separator 10, attached, in flow direction of a medium, in particular in form of a gas or air stream, to an air filtration system 12 comprising a main filter element 14 and a safety filter element 16. The main filter element 14 takes the form of a hollow cylinder and is comprised of a filter medium with greater filter fineness. The main filter element 14 is able to house the safety filter element 16 concentrically inside it. The safety filter element 16 also takes the form of a hollow cylinder, but its filter medium is of a lesser filter fineness compared to that of the main filter element 14. Both filter elements 14, 16 may be disposed inside a pot-shaped lower housing part 18. To facilitate this, the lower housing part 18 is provided with an integrated connection socket 20 to connect to the end of the main filter element 14, as well as with a further integrated socket 22 to connect to the one end of the safety filter element 16. Each of the filter elements is secured to the socket-shaped connectors 20, 22 in a sealing manner. Provided at the bottom of the pot-shaped lower housing part 18 is a socket-shaped medium outlet 24, which supplies the clean air generated by the separating device to a commonly used combustion engine (not shown) of a machine or some other kind of vehicle. Instead of the combustion engine it is also possible to clean compressor air using the separating device.

When viewing FIG. 1, a further outlet opening 26 is provided adjacent to the medium outlet 24 at the bottom end, extending at an angle, which outlet opening is provided to discharge the solid contaminants from the separating device. The outlet opening 26 facilitates in particular the dust discharge from the air into the environment. To facilitate the dust discharge via the socket-shaped outlet opening 26 from the lower housing part 18, the outlet opening 26 may be connected to an exhaust system of the combustion engine (not shown in detail). The exhaust system generates a vacuum when the combustion engine is in operation, which vacuum facilitates the dust discharge from the outlet opening 26. To help avoid the undesired introduction of contaminants or moisture from the environment into the inside of the lower housing part 18, the outlet opening 26 may be provided with a dust discharge valve (not shown). In particular, that valve may be a spring-loaded non-return valve, which opens under the suction effect of the exhaust system in the direction of the free opening cross-section of the outlet opening 26 when the device and the combustion engine are in operation, and closes towards the inside of the lower housing part 18, for example when the combustion engine has stopped.

The already introduced spiral separator 10 is disposed in a lid-shaped upper housing part 28, the inside of which surrounds the outer circumference of the spiral separator 10 at a predeterminable distance. The lower housing part 18 together with the upper housing part 28 forms the complete housing 30 of the separating device. Moreover, it is in the usual manner possible to attach the upper housing part 28 in a detachable manner to the lower housing part 18 via toggle type fasteners 32, of which only one fastener is shown in FIG. 1. When installing the separating device in an overall air supply system or exhaust system, it is to be expected that the lower housing part 18 is located and attached in the vicinity of the not-depicted combustion engine and remains there when filter elements are exchanged.

The complete housing 30 will be opened in particular if the contaminated main filter element 14 has to be replaced with a new element. The already described, safety filter element 16 may remain in its socket-shaped connector 22 in the lower housing part 18, so that in the instance that the new main filter element 14 is inadvertently not installed, the separation process with the device is still possible because the safety filter element 16 still separates particulate contaminants from the medium gas stream, even in the instance where it was overlooked to insert the new main filter element 14. Thus, the remaining safety filter element 16 prevents in any case that any contaminated air damages the combustion engine that is connected to the separating device.

On the side that faces the main filter element 14, the spiral separator 10 is also provided with a pot-shaped connector 34, into which the main filter element 14 can be inserted in a sealing manner with the end that faces the spiral separator 10. Moreover, the spiral separator 10 is attached to the upper housing part 28 via three through-bolts 36 that pass from the free end face through the upper housing part 28. Each of the fastening points is depicted in dashed lines in FIG. 1. Furthermore, the upper housing part 28 is provided with a medium inlet 38 in form of a hollow socket on the free end face that points outwards.

The medium or air intake takes place via the medium inlet 38 of the upper housing part 28. The air intake follows the depicted arrow in axial direction to the longitudinal axis of the overall separating device. Due to the spiral separator 10, the axial air intake flow is transformed into a rotational movement towards the outside. The superimposition of this rotational air movement with the axial intake flow of the air via the medium inlet 38 causes the spiral-shaped movement of the medium or air stream along the spiral track 40 to move to the inner wall of the complete housing 30. In order to ensure an undisturbed spiral track path 40 for the air stream, the spiral separator 10 as well as the main filter element 14 is provided, in radial direction relative to the longitudinal axis, with a predeterminable distance to the upper housing part 28 and to the lower housing part 18 respectively. If the air stream in question contains particulate contamination, such as dust, the air laden with dust is accelerated through the depicted spiral track 40 and the air is directed along the inner wall of the complete housing 30 in the direction of the medium outlet 24. The solid contaminant in form of this dust is slowed down through friction on the inside wall of the complete housing 30 and is then discharged via the dust discharge valve (not shown) from the outlet opening 26 from the complete housing 30, preferably into the exhaust gas system of the vehicle. The remaining air is then cleaned further through the main filter element 14 and ends up in form of clean air via the medium outlet 24 at the combustion chambers of the connected combustion engine.

Figure 2:
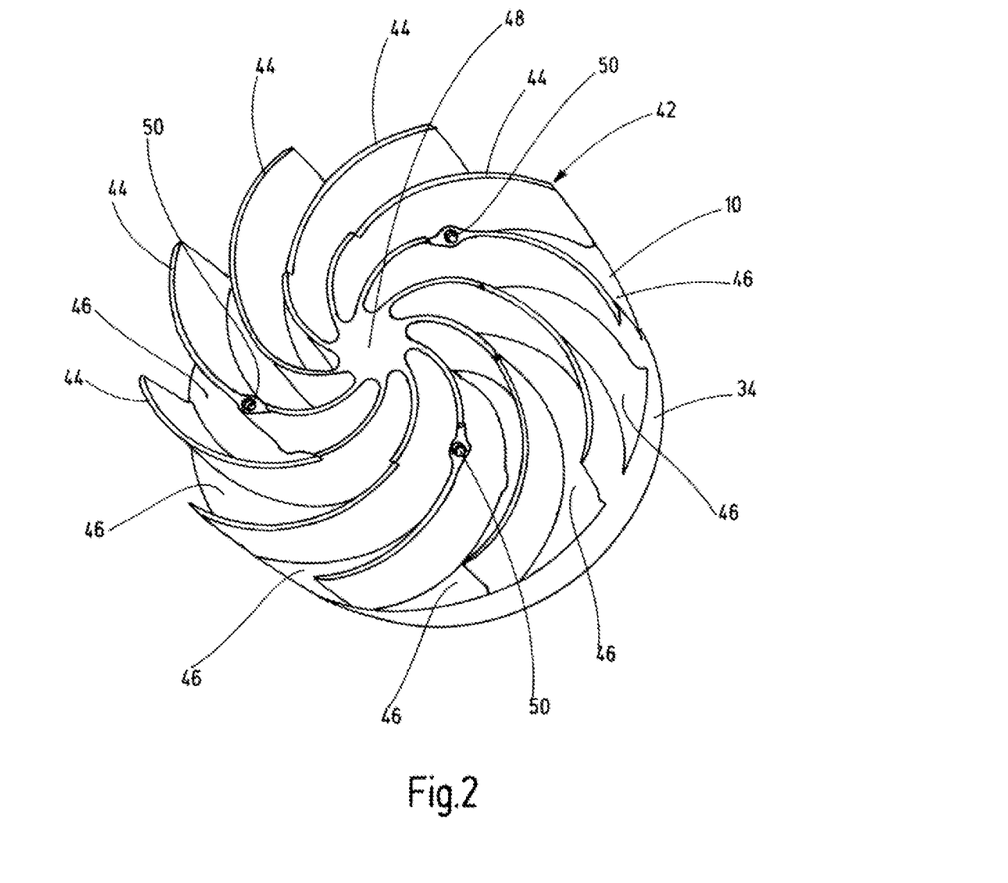
FIG. 2 is a perspective view of the spiral separator of FIG. 1.

The FIG. 2 depicts the end face of the spiral separator 10 in a perspective view. The spiral separator 10 is provided with a spiral guiding device 42 in form of individual spiral arms 44, which are located on the end surface of the pot-shaped connector 34. Disposed underneath the spiral separator 10, is the main filter element 14. This spiral separator may be designed as a single piece. The cylindrical connector part 34 may in particular be produced in form of an injection-moulded part in one piece together with the spiral guiding device 42 with the individual spiral arms 44. As is particularly apparent from the end views in FIGS. 3 and 4, the individual spiral arms 44, which are arranged in adjacent pairs, delimit radially outwards expanding flow spaces 46, located opposite to each other. These spaces guide the medium or air stream radially from the inside to the outside. That guidance of the air may take place, accelerating from inside to the outside via the radially expanding flow spaces 46.

The individual spiral arms 44 converge inwards to a common area 48. The raw air or surrounding air, which contains more or less dust and which is supplied axially via the medium inlet 38, impacts on the cylindrical plate that forms the common area 48. From common area 48, the air is evenly distributed into the flow spaces 46 and is moved radially outwards. As is also shown in FIG. 2, respective spiral arms 44 are provided with evenly spaced threads 50 for engagement with the respective through-bolts 36 to facilitate the mounting of the spiral guiding device 42 on the lid-shaped upper housing part 28, which then forms the spiral separator 10.

Figure 3:
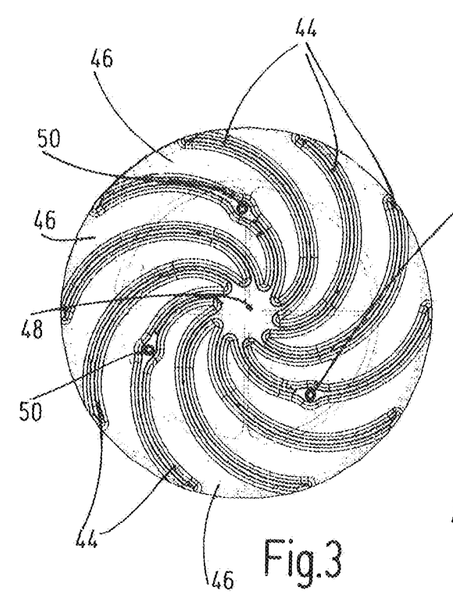
FIGS. 3 and 4 are plan views of the end face of the spiral separator of FIG. 2, with diverging spiral arms in a counter-clockwise direction and in clockwise direction, respectively.
Figure 4:
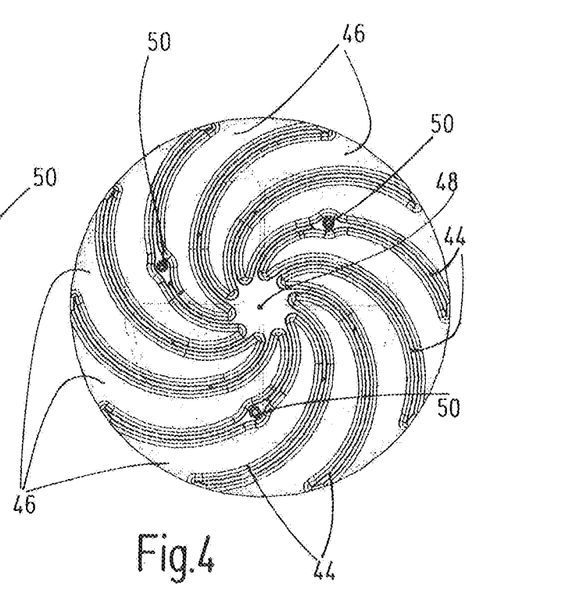

As is particularly apparent from FIGS. 3 and 4, the spiral arms 44 may be disposed on the pot-shaped connector 34 as left-rotating or right-rotating. Moreover, all spiral arms 44 end with their free ends flush at the common plane or surface of the cylindrical outer circumference of the pot-shaped connector 34. If, for example, the medium inlet 38 is provided with an acceleration section that conically reduces in the direction of the spiral separator 10, the air that is aspirated in an accelerated manner by the combustion engine via the medium outlet 24 can then strike and be correspondingly accelerated. The common connection area 48 of the spiral separator 10 at the inlet side then receives an initial acceleration, which is advantageous for the discharge behaviour of the particulate contamination from the medium stream. The volume quantity of the gas or air stream that is to be accelerated by the spiral separator 10 is adjustable not only through the size of the intake opening, that is, the medium inlet 38, but also via the axial height of the vane-shaped spiral arms 44 of the spiral guiding device 42. The speed of the medium or gas flow on the other hand is determined by the number of spiral arms 44 as well as their length 52 which, according to the depiction in FIG. 5, results from the design of the respective spiral arms 44 in the shape of a Fibonacci spiral, in which the golden section is implemented in the design. Since the spiral arms 44, with their ends that face each other, end in a common area 48, not the entire Fibonacci spiral is realised towards the inside.

Figure 5:
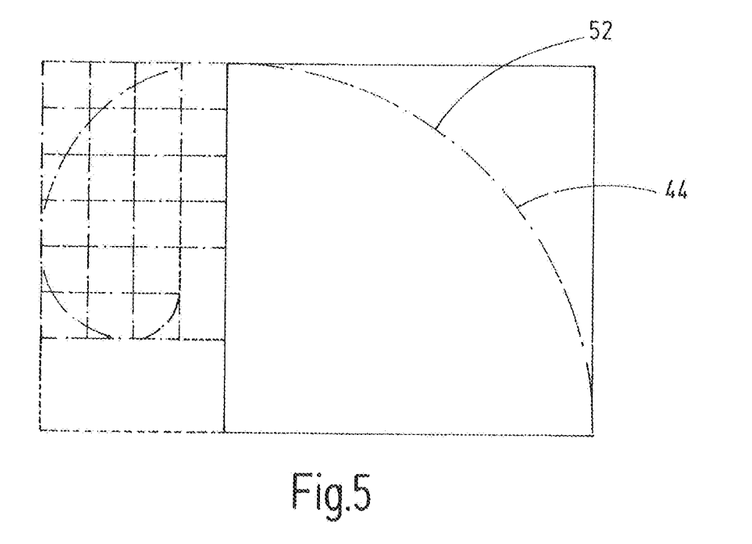
FIG. 5 is a graphical illustration of the design of a spiral arm as a Fibonacci spiral for the spiral separator according to the FIGS. 2 to 4.
Figure 6:
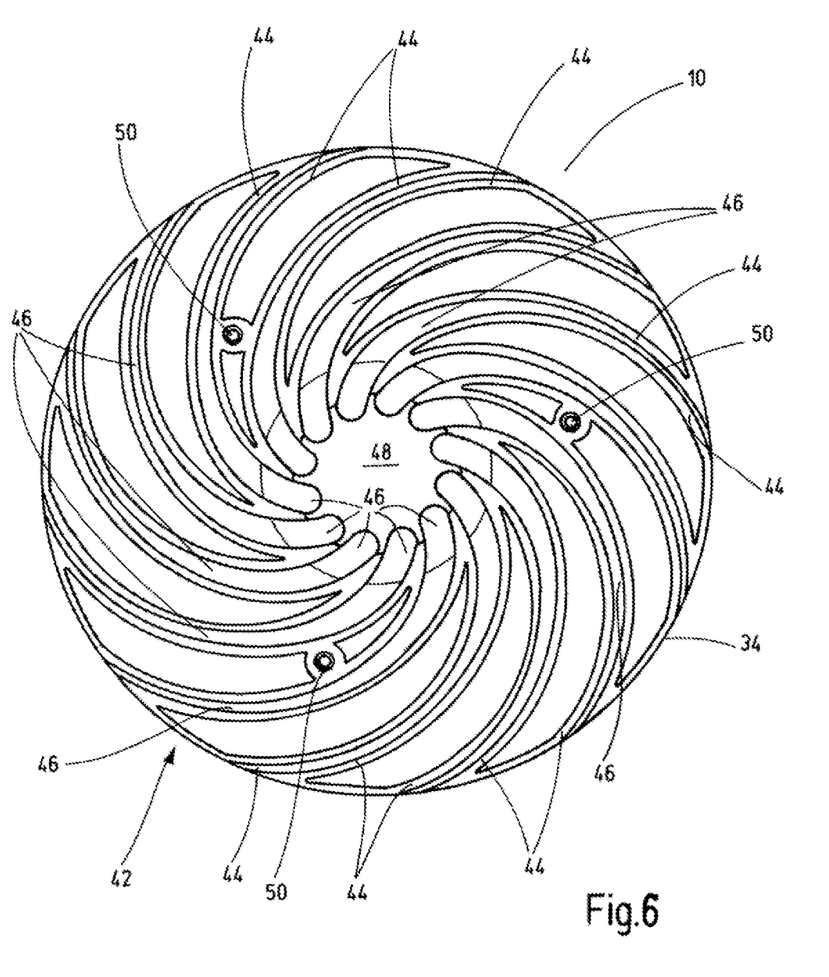
FIGS. 6 and 7 are plan views of converging and parallel spiral arms, respectively.
Figure 7:
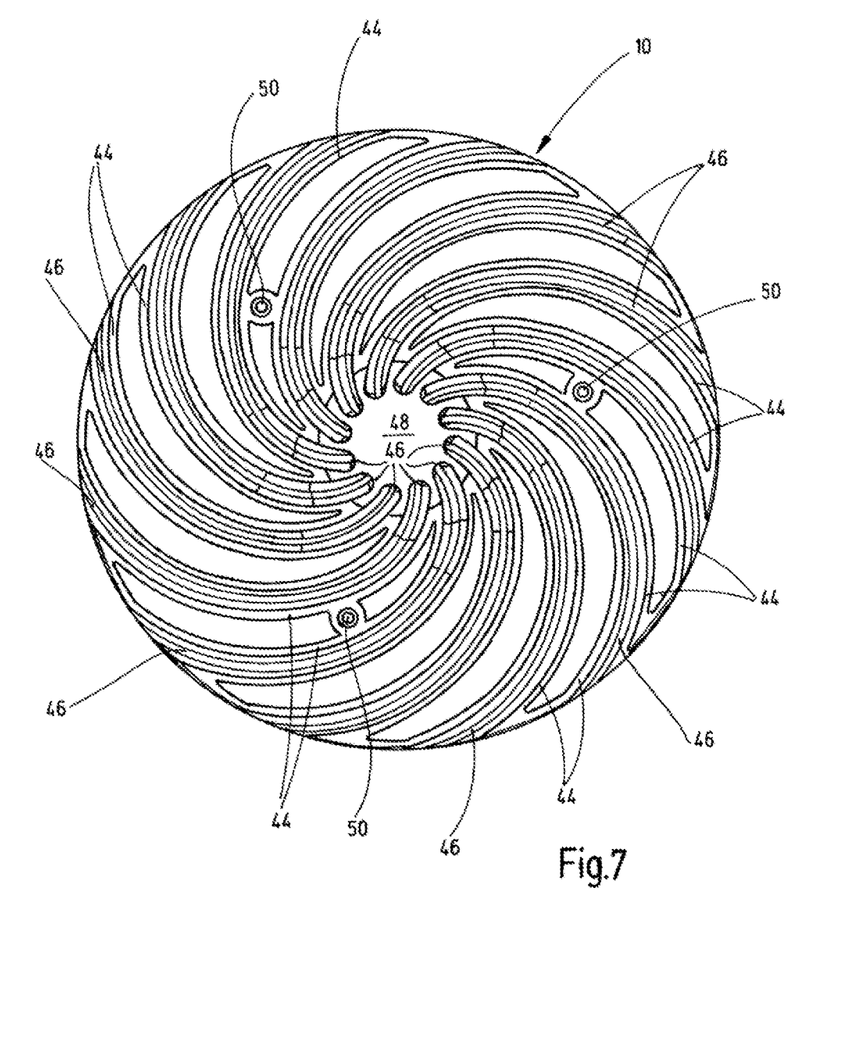

As the diagrams according to FIGS. 2 to 4 show, the individual spiral arms 44 are arranged divergent, that is, starting from the central connection area 48, the individual flow spaces 46 expand. Each of the flow spaces 46 is bounded by pairs of spiral arms 44 from inside to outside so that in this manner the flow speed is reduced in that direction provided that the application, which is dependent on the particulate contamination. In a converging arrangement of the spiral arms 44 on the other hand, as shown in FIG. 5, the flow spaces 46 can reduce in outward direction starting from the centre section 48, which results in an increase in flow speed from inside to outside. In the embodiment according to FIG. 6, on the other hand, the individual spiral arms 44 are arranged essentially parallel to each other in pairs, so that the flow spaces 46 from inside to outside remain constant, which also results in a constant flow velocity.

The cylindrical extension of the spiral separator 10 in form of the pot-shaped connector 34, following the individual spiral arms 44 or spiral vanes, facilitates the radial guidance of the solids-contaminated gas or air stream in longitudinal direction of the cylindrical inner wall of the complete housing 30. Due to the volumetric difference resulting from this, the precipitation of the solids is usually in form of dust from the gas/air stream. The solids are transported along the inside of the housing wall up to the accumulation point in form of the discharge opening 26 in housing 30 and are disposed from there into the environment. The spiral separator 10 according to the invention may be utilised as pre-separator in the described air filtration system 12, followed by a radially or axially sealing filter element, in particular in form of the main filter element 14 where dirt particles such as dust flow around it inside housing 30. The air flows through the filter element, respectively. This arrangement results in a complete separation of the particles/gas mixture, and clean air can be fed via the medium outlet 24 of housing 30 into the combustion chambers of the combustion engine.

While various embodiments have been chosen to illustrate the invention, it will be understood by those skilled in the art that various changes and modifications can be made therein without departing from the scope of the invention as defined in the claims.

The invention claimed is:

1. A separator for separating solid contaminants from a gaseous medium stream, the separator comprising:
   a housing having a cylindrical inner wall with a longitudinal axis, having a medium inlet capable of feeding the gaseous medium stream with the solid contaminants into said housing, having a medium outlet and having a solid outlet opening, said medium inlet and said medium outlet being on opposite ends of said housing;
   a hollow cylinder filter element being in said inner wall of said housing and being spaced by a distance in a radial direction relative to said longitudinal axis from said inner wall of said housing;
   a spiral-shaped guiding device being inside said inner wall of said housing, being spaced by a distance in the radial direction from said inner wall of said housing and being in fluid communication with said medium inlet for being feed with gaseous medium stream with the solid contaminants and for at least partially causing separation of the solid contaminants from the gaseous medium stream, said guiding device being a plurality of spiral arms arranged in adjacent pairs and delimiting radially extending flow spaces relative to said longitudinal axis located opposite one another capable of directing and accelerating flow of the gaseous medium stream radially outwardly though spiral tracks to and along said inner wall of said housing toward said medium outlet such that movement of the solid contaminants is slowed by friction on said inner wall of said housing and discharged from said housing through said solid outlet opening and such that the gaseous medium stream passes through and is cleaned through said filter element before being discharged from said housing through said medium outlet, said spiral arms being located on an end surface of a pot shaped connector located on a side of said guiding device facing said medium inlet, said filter element being removably inserted in said pot-shaped connector in a side of said pot-shaped connector remote from said medium inlet allowing replacement of said filter element without replacing said guiding device.

2. A separator according to claim 1 wherein
said medium inlet extends axially along said longitudinal axis and is axially aligned with a common joining section of said spiral arms of said guiding device.

3. A separator according to claim 2 wherein
said flow spaces extend from said common joining section and diverge radially outward from said longitudinal axis.

4. A separator according to claim 2 wherein
said flow spaces extend from said common joining section and converge radially outward from said longitudinal axis.

5. A separator according to claim 2 wherein
said flow spaces extend from said common joining section and have essentially common width radially outward from said longitudinal axis with said spiral arms extending parallel to each other.

6. A separator according to claim 2 wherein
said spiral arms converge toward said common joining section on a cylindrical plate of said guiding device; and
said medium inlet directs the gas medium stream to impact said cylindrical plate at said common joining section where the gas medium stream is evenly distributed into said flow spaces and directed radially outwards.

7. A separator according to claim 2 wherein
said common joining section is free of said arms.

8. A separator according to claim 1 wherein
said spiral shaped arms cause spiral shaped medium flows of the gaseous medium stream to precipitate solids on said inner wall of said housing.

9. A separator according to claim 1 wherein
each of said spiral arms have a same length and height.

10. A separator according to claim 1 wherein
said filter element is connected to said guiding device in a downstream flow direction of the gaseous medium stream through the separator.

11. A separator according to claim 10 wherein
a safety filter element in the downstream flow direction of the gaseous medium stream through the separator.

12. A separator according to claim 1 wherein
said filter element is connected to said guiding device in a downstream flow direction of the gaseous medium stream through the separator; and
said medium outlet is disposed coaxial to said medium inlet.

13. A separator according to claim 12 wherein
said solid outlet opening is connected to an unfiltrate side of said filter element for discharging the solid contaminants from said housing.

14. A separator according to claim 1 wherein
said filter element is connected to said guiding device in a downstream flow direction of the gaseous medium stream through the separator; and
said guiding device and said filter element are located in first and second housing parts, respectively, said first and second housing parts being detachably coupled.

15. A separator according to claim 1 wherein
said spiral arms have increasing radii of curvature toward radially outer ends thereof.

16. A separator according to claim 1 wherein
said spiral arms extend along Fibonacci spirals outside of a common joining section of said spiral arms of said guiding device.

* * * * *